United States Patent
Tanizawa

(10) Patent No.: US 9,503,257 B2
(45) Date of Patent: Nov. 22, 2016

(54) QUANTUM KEY DISTRIBUTION DEVICE, QUANTUM KEY DISTRIBUTION SYSTEM, AND QUANTUM KEY DISTRIBUTION METHOD

(71) Applicant: Kabushiki Kaisha Toshiba, Minato-ku (JP)

(72) Inventor: Yoshimichi Tanizawa, Yokohama (JP)

(73) Assignee: Kabushiki Kaisha Toshiba, Minato-ku (JP)

(*) Notice: Subject to any disclaimer, the term of this patent is extended or adjusted under 35 U.S.C. 154(b) by 105 days.

(21) Appl. No.: 14/622,015

(22) Filed: Feb. 13, 2015

(65) Prior Publication Data
US 2015/0236852 A1 Aug. 20, 2015

(30) Foreign Application Priority Data
Feb. 17, 2014 (JP) ................ 2014-027682

(51) Int. Cl.
H04L 9/08 (2006.01)
(52) U.S. Cl.
CPC .......... *H04L 9/0858* (2013.01); *H04L 9/0852* (2013.01); *H04L 2209/30* (2013.01)
(58) Field of Classification Search
CPC . H04L 9/0852; H04L 9/0855; H04L 9/0858; H04L 2209/30
See application file for complete search history.

(56) References Cited

U.S. PATENT DOCUMENTS

| | | | |
|---|---|---|---|
| 7,260,222 B2* | 8/2007 | Ishizuka et al. | 380/255 |
| 7,646,873 B2* | 1/2010 | Lee et al. | 380/277 |
| 7,734,757 B2* | 6/2010 | Maeda et al. | 709/223 |
| 8,639,932 B2* | 1/2014 | Wiseman et al. | 713/171 |
| 8,650,401 B2* | 2/2014 | Wiseman et al. | 713/171 |
| 8,654,979 B2* | 2/2014 | Hicks | 380/278 |
| 8,681,982 B2* | 3/2014 | Wiseman et al. | 380/255 |
| 8,683,192 B2* | 3/2014 | Ayling et al. | 713/153 |

(Continued)

FOREIGN PATENT DOCUMENTS

| | | |
|---|---|---|
| JP | 4015385 B2 | 11/2007 |
| JP | 2008-154019 A | 7/2008 |

OTHER PUBLICATIONS

Gisin, et al., Quantum Cryptography, Jan. 2002, Reviews of Modern Physics, vol. 74, 145-195.*

(Continued)

*Primary Examiner* — Matthew Smithers
*Assistant Examiner* — Nelson Giddins
(74) *Attorney, Agent, or Firm* — Oblon, McClelland, Maier & Neustadt, L.L.P.

(57) ABSTRACT

According to an embodiment, a quantum key distribution device includes a key sharing unit, a correcting unit, a compressor, and a controller. The key sharing unit is configured to generate a shared bit string by using quantum key distribution performed with another quantum key distribution device via a quantum communication channel. The correcting unit is configured to generate a corrected bit string through an error correction process with respect to the shared bit string. The compressor is configured to generate an encryption key through a key compression process with respect to the corrected bit string. The controller is configured to perform a restraining operation in which the total number of bits of encryption keys generated per unit time by the compressor is smaller than the total number of bits of the encryption keys generated per unit time by the compressor in the case of not performing the restraining operation.

11 Claims, 7 Drawing Sheets

(56) References Cited

U.S. PATENT DOCUMENTS

| | | | |
|---|---|---|---|
| 8,755,525 B2* | 6/2014 | Wiseman | 380/255 |
| 8,792,791 B2* | 7/2014 | Wiseman et al. | 398/186 |
| 8,811,829 B2* | 8/2014 | Yuan et al. | 398/208 |
| 8,855,316 B2* | 10/2014 | Wiseman et al. | 380/278 |
| 2002/0025041 A1* | 2/2002 | Tomita | 380/256 |
| 2004/0068655 A1* | 4/2004 | Nishimura et al. | 713/171 |
| 2004/0109564 A1* | 6/2004 | Cerf et al. | 380/256 |
| 2004/0139132 A1* | 7/2004 | Lutkenhaus et al. | 708/250 |
| 2005/0036624 A1* | 2/2005 | Kent et al. | 380/277 |
| 2006/0013396 A1* | 1/2006 | Kollmitzer | 380/256 |
| 2006/0059343 A1* | 3/2006 | Berzanskis et al. | 713/171 |
| 2006/0059403 A1* | 3/2006 | Watanabe | 714/758 |
| 2007/0009098 A1* | 1/2007 | Tanaka et al. | 380/30 |
| 2007/0014415 A1* | 1/2007 | Harrison et al. | 380/278 |
| 2007/0064945 A1* | 3/2007 | Yuan et al. | 380/263 |
| 2007/0192598 A1* | 8/2007 | Troxel et al. | 713/168 |
| 2007/0228373 A1* | 10/2007 | Takemoto et al. | 257/53 |
| 2007/0230688 A1* | 10/2007 | Tajima et al. | 380/30 |
| 2007/0234051 A1* | 10/2007 | Akutsu et al. | 713/168 |
| 2008/0147820 A1* | 6/2008 | Maeda et al. | 709/213 |
| 2008/0263363 A1* | 10/2008 | Jueneman et al. | 713/184 |
| 2010/0241912 A1* | 9/2010 | Kwok et al. | 714/704 |
| 2010/0257434 A1* | 10/2010 | Harrison et al. | 714/785 |
| 2011/0173696 A1* | 7/2011 | Dynes et al. | 726/22 |
| 2011/0213979 A1* | 9/2011 | Wiseman et al. | 713/171 |
| 2012/0087500 A1* | 4/2012 | Ukita et al. | 380/256 |
| 2012/0269345 A1* | 10/2012 | Ukita et al. | 380/256 |
| 2012/0294625 A1* | 11/2012 | Dynes et al. | 398/155 |
| 2013/0101119 A1* | 4/2013 | Nordholt et al. | 380/256 |
| 2013/0101121 A1* | 4/2013 | Nordholt et al. | 380/279 |
| 2013/0163759 A1* | 6/2013 | Harrison et al. | 380/268 |
| 2013/0251145 A1* | 9/2013 | Lowans et al. | 380/44 |
| 2013/0251154 A1* | 9/2013 | Tanizawa et al. | 380/278 |
| 2013/0315395 A1* | 11/2013 | Jacobs | 380/278 |
| 2014/0068765 A1* | 3/2014 | Choi et al. | 726/23 |
| 2015/0188701 A1* | 7/2015 | Nordholt et al. | 713/171 |
| 2015/0215122 A1* | 7/2015 | Takahashi et al. | 380/283 |
| 2015/0222619 A1* | 8/2015 | Hughes et al. | 713/168 |
| 2015/0312035 A1* | 10/2015 | Choi | 380/278 |
| 2015/0365230 A1* | 12/2015 | Bovino | 380/256 |

OTHER PUBLICATIONS

Christian Kollmitzer, et al., "Applied Quantum Cryptography", Lecture Notes in Physics 797, (Springer, Berlin Heidelberg 2010), pp. 1-217.

Mehrdad Dianati, et al., "Architecture and protocols of the future European quantum key distribution network", Security and Communication Networks, vol. 1, (2008), pp. 57-74.

* cited by examiner

QUANTUM KEY DISTRIBUTION DEVICE, QUANTUM KEY DISTRIBUTION SYSTEM, AND QUANTUM KEY DISTRIBUTION METHOD

CROSS-REFERENCE TO RELATED APPLICATION

This application is based upon and claims the benefit of priority from Japanese Patent Application No. 2014-027682, filed on Feb. 17, 2014; the entire contents of which are incorporated herein by reference.

FIELD

Embodiments described herein relate generally to a quantum key distribution device, a quantum key distribution system, and a quantum key distribution method.

BACKGROUND

A quantum key distribution system is configured with a transmitter, a receiver, and an optical fiber that connects the transmitter and the receiver. The transmitter transmits photons to the receiver via the optical fiber (a quantum communication channel). After that, the transmitter and the receiver exchange control information with each other, and share encryption keys in a confidential fashion. This technology is implemented using the technology generally referred to as quantum key distribution (QKD).

In quantum key distribution, the behavior of the photons follows the uncertainty principle, which is the fundamental principle of quantum mechanics that tapping leads to changes in the state. Because of such a property, when photons transmitted by a transmitter are tapped by an eavesdropper in a quantum communication channel, the state of the photons undergoes a change and the receiver that receives the photons becomes able to get to know that the photons have been tapped by an eavesdropper.

The encryption keys generated in a quantum key distribution system are used by various applications that perform cryptographic communication. Usually, if many encryption keys are generated, then there is a proportional increase in the encryption strength and communicable time of the cryptographic communication. Hence, it is desired that encryption keys having a large size be generated in large numbers with a high frequency.

Meanwhile, it is necessary that the transmission of photons in quantum key distribution is performed while ensuring synchronization between the transmitter and the receiver. Hence, if the operations are temporarily stopped, then the temporal cost of restarting the operations is high. Therefore, it is not desirable to stop the transmission of photons during quantum key distribution. However, if generation of encryption keys is carried on in concert with the transmission of photons, then it may lead to an increase in the processing load of the transmitter and the receiver that generate the encryption keys, or it may lead to unnecessary generation of the encryption keys, or it may place burden on the amount of available space in the storage used in storing the encryption keys.

DETAILED DESCRIPTION

Figure 1:
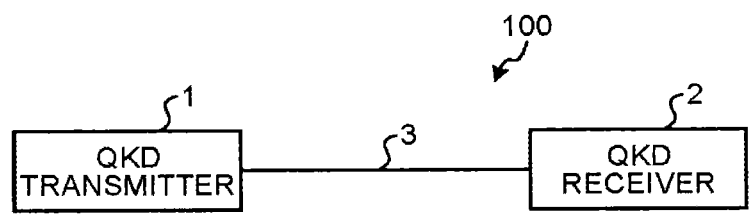
FIG. 1 is a diagram illustrating a configuration example of a quantum key distribution system.

According to an embodiment, a quantum key distribution device is connected to another quantum key distribution device via a quantum communication channel and generates and shares an identical encryption key with the another quantum key distribution device. The quantum key distribution device includes a quantum key sharing unit, a correcting unit, a compressor, and a controller. The quantum key sharing unit is configured to generate a shared bit string by using quantum key distribution performed with the another quantum key distribution device via the quantum communication channel. The correcting unit is configured to receive the shared bit string from the quantum key sharing unit and generate a corrected bit string through an error correction process with respect to the shared bit string. The compressor is configured to receive the corrected bit string from the correcting unit and generate an encryption key through a key compression process with respect to the corrected bit string. The controller is configured to perform a restraining operation in which the total number of bits of one or more encryption keys generated per unit time by the compressor is smaller than the total number of bits of the one or more encryption keys generated per unit time by the compressor in the case of not performing the restraining operation.

Exemplary embodiments of a quantum key distribution device, a quantum key distribution system, and a quantum key distribution method according to the invention are described below in detail with reference to the accompanying drawings. In the accompanying drawings, the same constituent elements are referred to by the same reference numerals. However, the drawings are only schematic in nature, and the specific configuration should be determined by taking into account the explanation given below.

First Embodiment

FIG. 1 is a diagram illustrating a configuration example of a quantum key distribution system. Thus, the explanation of a quantum key distribution system 100 is explained with reference to FIG. 1.

As illustrated in FIG. 1, the quantum key distribution system 100 includes a QKD transmitter 1, a QKD receiver 2, and an optical fiber cable 3. The following explanation is mainly given for the quantum key distribution system 100 that includes a single QKD transmitter 1 and a single QKD receiver 2. However, alternatively, the quantum key distribution system 100 can also be, what is called, a quantum access network (see FIG. 6 referenced later) in which a single QKD receiver 2 has a plurality of QKD transmitters 1 connected thereto via an optical instrument. Still alternatively, the quantum key distribution system 100 can also be a quantum key distribution system in which the QKD receiver 2 has a plurality of interfaces for optical fiber communication and is connected to a plurality of QKD transmitters 1 via the interfaces. In this case, the roles can be reversed, and the QKD transmitter 1 can be connected to a plurality of QKD receivers 2.

Herein, for example, the QKD transmitter 1 transmits, to the QKD receiver 2 via the optical fiber cable 3, a bit string (hereinafter, referred to as a "photon bit string") that is made of single photons which are generated using random numbers and which serve as the basis for generating encryption keys. Moreover, the QKD transmitter 1 performs shifting, an error correction (EC) process, and a privacy amplification (PA) process based on the photon bit string that is sent; and generates an encryption key.

The QKD receiver 2 receives, from the QKD transmitter 1 via the optical fiber cable 3, the photon bit string made of single photons that serve as the basis for generating encryption keys. Then, the QKD receiver 2 performs a shifting process, an error correction process, and a privacy amplification process based on the photon bit string that is received, and generates an encryption key that is identical to the encryption key generated by the QKD transmitter 1. That is, the QKD transmitter 1 and the QKD receiver 2 generate and share identical encryption keys.

The optical fiber cable 3 functions as a quantum communication channel that is a transmission path for the single photons output by the QKD transmitter 1. Meanwhile, although not illustrated in FIG. 1, aside from the quantum communication channel in the form of the optical fiber cable 3, the QKD transmitter 1 and the QKD receiver 2 are connected to each other by a communication cable (a classical communication channel) that is used in communicating regular digital data of 0s and 1s. The classical communication channel need not be a wired communication channel, and can be a wireless communication channel.

Because of the quantum key distribution system 100 including the QKD transmitter 1 and the QKD receiver 2; in case the single photons transmitted by the QKD transmitter 1 are tapped by an eavesdropper from the optical fiber cable 3 functioning as the quantum communication channel, the photons undergo physical changes thereby enabling the QKD receiver 2 that has received the photons to know that the photons have been tapped by an eavesdropper. Meanwhile, regarding an encryption key generation process performed by the QKD transmitter 1 and the QKD receiver 2, the detailed explanation is given later. Moreover, while collectively referring to the QKD transmitter 1 and the QKD receiver 2, the term "QKD device" is used.

Figure 2:
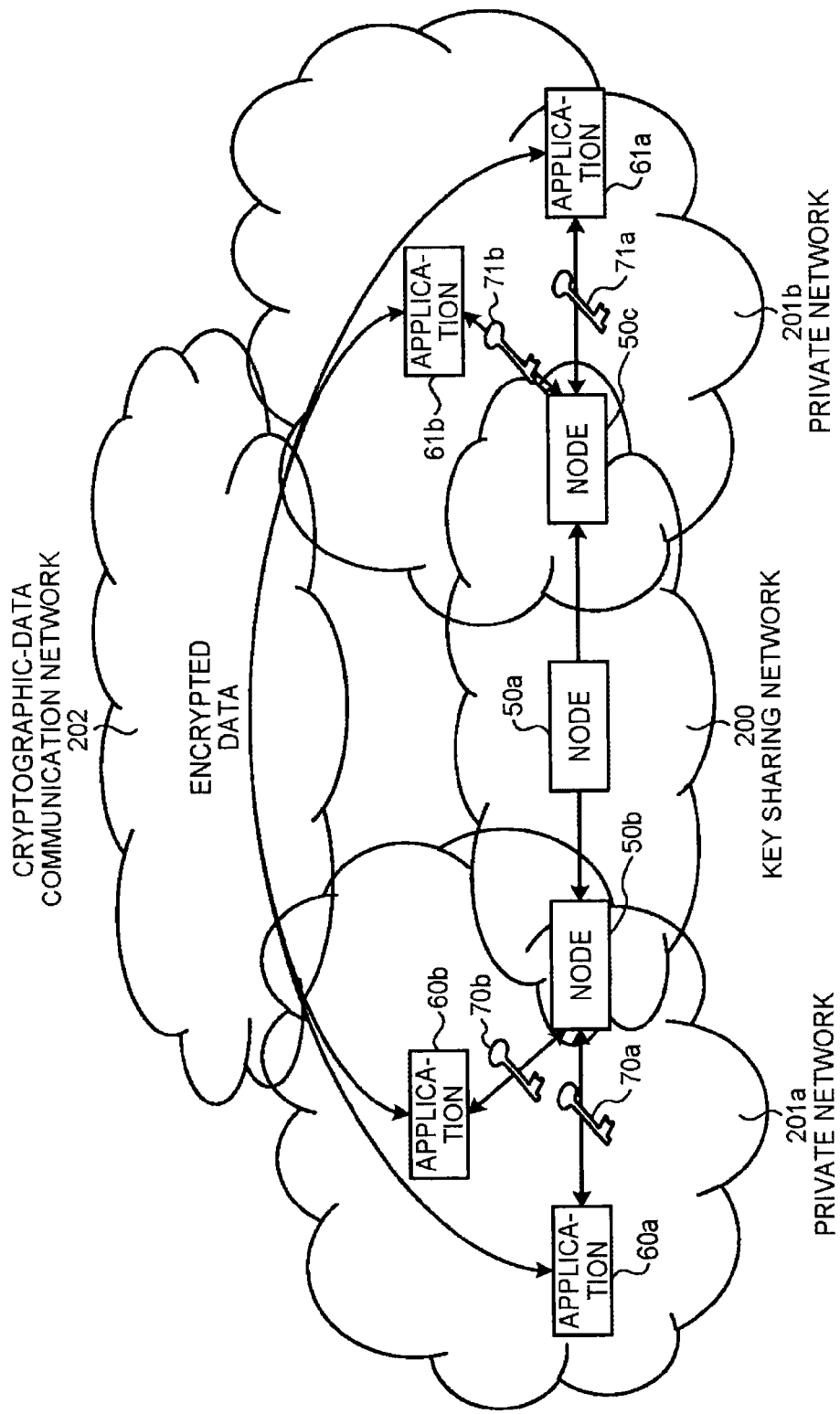
FIG. 2 is a diagram illustrating a configuration example of a quantum key distribution network.

FIG. 2 is a diagram illustrating a configuration example of a quantum key distribution network. Thus, the explanation about the quantum key distribution network is given with reference to FIG. 2.

The quantum key distribution network mainly includes two networks, namely, a key sharing network and a cryptographic-data communication network. With reference to FIG. 2, the quantum key distribution network includes a key sharing network 200, private networks 201a and 201b, and a cryptographic-data communication network 202.

As illustrated in FIG. 2, the key sharing network 200 includes nodes 50a to 50c that function as QKD devices. The node 50a and the node 50b are connected to each other by a quantum communication channel. One of the nodes 50a and 50b functions as the transmitter and the other node functions as the receiver. Thus, as described above, the nodes 50a and 50b generate identical encryption keys. The same is true in the case of the node 50a and the node 50c. In this way, the identical encryption keys generated and shared by mutually-connected QKD devices are referred to as a link key. Meanwhile, the quantum key distribution system 100 is included in the key sharing network 200.

As illustrated in FIG. 2, the node 50b and the node 50c are not directly connected to each other by a quantum communication channel. In this case, the node 50a and the node 50b that are directly connected to each other by a quantum communication channel generate identical encryption keys (a link key a-b). In an identical manner, the node 50a and the node 50c that are directly connected to each other by a quantum communication channel generate identical encryption keys (a link key a-c) different than the link key a-b. Then, the node 50c separately generates an encryption key (referred to as an "application key b-c") using random numbers; encrypts the application key b-c with the link key a-c; and transmits the encrypted application key b-c to the node 50a via the classical communication channel. Then, the node 50a decrypts the received application key b-c with the link key a-c; encrypts the now-decrypted application key b-c with the link key a-b; and sends the newly-encrypted application key b-c to the node 50b via the classical communication channel. Subsequently, the node 50b decrypts the received application key b-c with the link key a-b and holds the decrypted application key b-c. As a result, the node 50b and the node 50c happen to share the application key b-c as identical encryption keys.

As illustrated in FIG. 2, the private network 201a includes the node 50b, an application 60a, and an application 60b. Herein, the private network 201a is configured under the premise that communication between the information processing devices constituting the private network 201a (In the example illustrated in FIG. 2, safety of communication between the node 50b, the application 60a, and the application 60b) is secured from the safety perspective. The same is true in the case of the private network 201b (described later).

The applications 60a and 60b are information processing devices that execute applications having predetermined functions. Moreover, the applications 60a and 60b respectively receive encryption keys 70a and 70b (link keys or application keys) from the node 50b. Then, using the encryption keys 70a and 70b, the applications 60a and 60b perform cryptographic communication with the information processing devices included in other networks (such as, the private network 201b illustrated in FIG. 2) via the cryptographic-data communication network 202.

As illustrated in FIG. 2, the private network 201b includes the node 50c, an application 61a, and an application 61b.

The applications 61a and 61b are information processing devices that execute applications having predetermined functions. Moreover, the applications 61a and 61b respectively receive encryption keys 70a and 70b (link keys or application keys) from the node 50c. Then, using encryption keys 71a and 71b, the applications 61a and 61b perform cryptographic communication with the information processing devices included in other networks (such as, the private network 201a illustrated in FIG. 2) via the cryptographic-data communication network 202.

For example, the cryptographic communication between the application 60a of the private network 201a and the application 61a of the private network 201b is performed in the following manner. Firstly, in the key sharing network 200, as described above, the nodes 50*b* and 50*c* share identical encryption keys in the form of an application key. In the example illustrated in FIG. 2, it is assumed that the encryption key 70*a* belonging to the node 50*b* and the encryption key 71*a* belonging to the node 50*c* are identical encryption keys (application keys). Then, the node 50*b* sends the encryption key 70*a* to the application 60*a*, and the node 50*c* sends the encryption key 71*a* to the application 61*a*. Subsequently, the applications 60*a* and 61*a* encrypt the target data for communication respectively using the encryption keys 70*a* and 71*a*, which are identical encryption keys.

Figure 3:
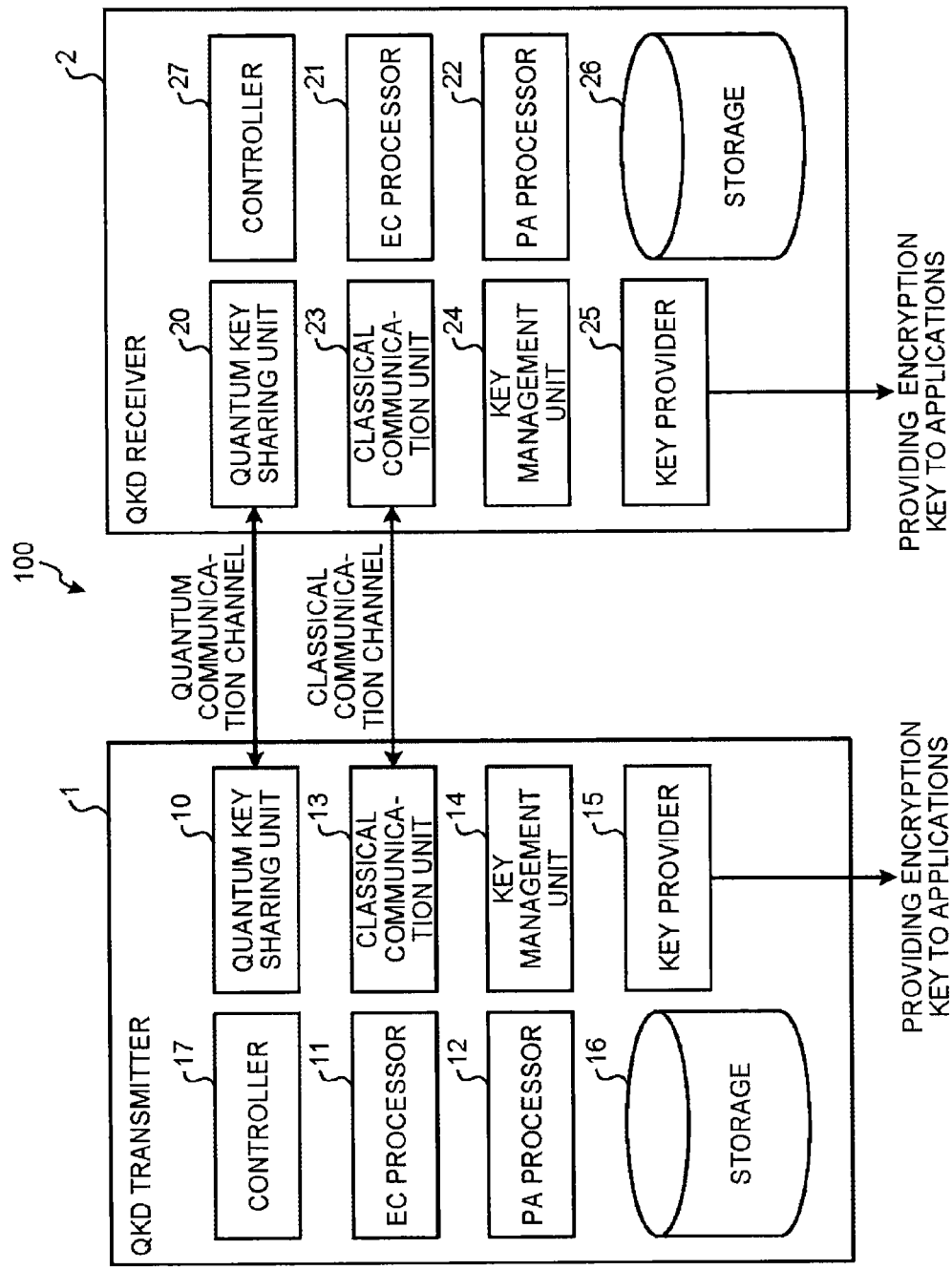
FIG. 3 is a diagram illustrating an exemplary block configuration of a QKD transmitter and a QKD receiver.

FIG. 3 is a diagram illustrating an exemplary block configuration of the QKD transmitter and the QKD receiver according to the first embodiment. Thus, the explanation of a functional block configuration of the QKD transmitter 1 and the QKD receiver 2 is given with reference to FIG. 3.

The QKD transmitter 1 includes a quantum key sharing unit 10, an EC processor 11 (an error correcting unit), a PA processor 12 (a compressor), a classical communication unit 13, a key management unit 14, a key provider 15, a storage 16, and a controller 17.

For example, the quantum key sharing unit 10 sends, to the QKD receiver 2 via the quantum communication channel (i.e., via the optical fiber cable 3 illustrated in FIG. 1), a photon bit string made of single photons having a state based on base information generated in a random manner as against a bit string generated using random numbers. Then, the quantum key sharing unit 10 receives, via the classical communication channel, the base information generated in a random manner by the QKD receiver 2 (by a quantum key sharing unit 20 (described later)) for the purpose of reading a photon bit string received. Subsequently, the quantum key sharing unit 10 compares the base information generated by itself with the base information received from the quantum key sharing unit 20; extracts the bits corresponding to the matching portion from the photon bit strings; and treats the extracted bits as a shared bit string. The length of the shared bit string is determined based on the base information generated in a random manner by the quantum key sharing units 10 and 20. Hence, if the selection of the base information is genuinely random in nature; then, statistically, the length of the shared bit string is substantially half of the photon bit strings.

The EC processor 11 exchanges control data (EC information) with an EC processor 21 (described later) via the classical communication channel; corrects the bit errors in the shared bit string; and generates a corrected bit string. Herein, the corrected bit string generated by the EC processor 11 matches with a corrected bit string that is generated by the EC processor 21 (described later) by performing correction with respect to the shared bit string.

The PA processor 12 receives control data (PA information) from a PA processor 22 (described later) via the classical communication channel; and performs a key compression process (a privacy amplification process) with respect to the corrected bit string with the aim of cancelling out, from the number of errors corrected by the EC processor 11, the bits that are likely to have been tapped by an eavesdropper during the operations of the quantum key sharing unit 10 and the EC processor 11. Herein, the bit string obtained by the PA processor 12 by performing the key compression process with respect to the corrected bit string is referred to as a key bit string and serves as the encryption key.

The classical communication unit 13 is, as described above, a communication interface that enables the quantum key sharing unit 10, the EC processor 11, and the PA processor 12 to send control data to and receive control data from the QKD receiver 2. Herein, the classical communication unit 13 can either be a wired interface or a wireless interface.

The key management unit 14 stores the encryption keys (the key bit string), which are generated by the PA processor 12, in the storage 16, and manages the stored encryption keys. Aside from the encryption keys (the key bit string), the key management unit 14 can also store at least either the photon bit string and the shared bit string generated by the quantum key sharing unit 10 or the corrected bit string generated by the EC processor 11. The key provider 15 obtains an encryption key from the storage 16 as may be necessary, and provides the encryption key to an external application. Herein, the storage 16 is a storage device used to store the encryption keys generated by the PA processor 12.

The controller 17 performs overall control of the QKD transmitter 1. The controller 17 entirely or partially deletes the shared bit string, the corrected bit string, or the key bit string; and does not send the deleted portion to the subsequent processors. The details of this process are given later as a restraining operation of encryption keys.

Meanwhile, the quantum key sharing unit 10, the EC processor 11, the PA processor 12, the key management unit 14, the key provider 15, and the controller 17 can be implemented either using computer programs that are executed in a central processing unit (CPU) 80 (described later) or using hardware circuitry.

The QKD receiver 2 includes the quantum key sharing unit 20, the EC processor 21 (error correcting unit), the PA processor 22 (compressor), a classical communication unit 23, a key management unit 24, a key provider 25, a storage 26, and a controller 27.

The quantum key sharing unit 20 receives the photon bit string from the QKD transmitter 1 via the quantum communication channel (i.e., via the optical fiber cable 3 illustrated in FIG. 1), and reads the photon bit string based on the base information generated in a random manner. Then, the quantum key sharing unit 20 receives, via the classical communication channel, the base information that is generated in a random manner by the QKD transmitter 1 (the quantum key sharing unit 10) for the purpose of sending the photon bit string. Subsequently, the quantum key sharing unit 20 compares the base information generated by itself with the base information received from the quantum key sharing unit 10; extracts the bits corresponding to the matching portion from the photon bit strings; and treats the extracted bits as a shared bit string. The length of the shared bit string is determined based on the base information generated in a random manner by the quantum key sharing units 10 and 20. Hence, if the selection of the base information is genuinely random in nature; then, statistically, the length of the shared bit string is substantially half of the photon bit strings.

The EC processor 21 exchanges control data (EC information) with the EC processor 11 via the classical communication channel; corrects the bit errors in the shared bit string; and generates a corrected bit string. Herein, the corrected bit string generated by the EC processor 21 matches with the corrected bit string generated by the EC processor 11 by performing correction with respect to the shared bit string.

The PA processor 22 sends control data (PA information) to the PA processor 12 via the classical communication channel; and performs a key compression process (a privacy amplification process) with respect to the corrected bit string with the aim of cancelling out, from the number of errors corrected by the EC processor 21, the bits that are likely to have been tapped by an eavesdropper during the operations of the quantum key sharing unit 20 and the EC processor 21. Herein, the bit string obtained by the PA processor 22 by performing the key compression process with respect to the corrected bit string is referred to as a key bit string and serves as the encryption key.

The classical communication unit 23 is, as described above, a communication interface that enables the quantum key sharing unit 20, the EC processor 21, and the PA processor 22 to send control data to and receive control data from the QKD transmitter 1. Herein, the classical communication unit 23 can either be a wired interface or a wireless interface.

The key management unit 24 stores the encryption keys (the key bit string), which are generated by the PA processor 22, in the storage 26, and manages the encryption keys. Aside from the encryption key (the key bit string), the key management unit 24 can also store at least either the photon bit string and the shared bit string generated by the quantum key sharing unit 20 or the corrected bit string generated by the EC processor 21. The key provider 25 obtains an encryption key from the storage 26 as may be necessary, and provides the encryption key to an external application. Herein, the storage 26 is a storage device used to store the encryption key generated by the PA processor 22.

The controller 27 performs overall control of the QKD receiver 2. The controller 27 entirely or partially deletes the shared bit string, the corrected bit string, or the key bit string; and does not send the deleted portion to the subsequent processors. The details of this process are given later.

Meanwhile, the quantum key sharing unit 20, the EC processor 21, the PA processor 22, the key management unit 24, the key provider 25, and the controller 27 can be implemented either using computer programs that are executed in the CPU 80 (described later) or using hardware circuitry.

Figure 4:
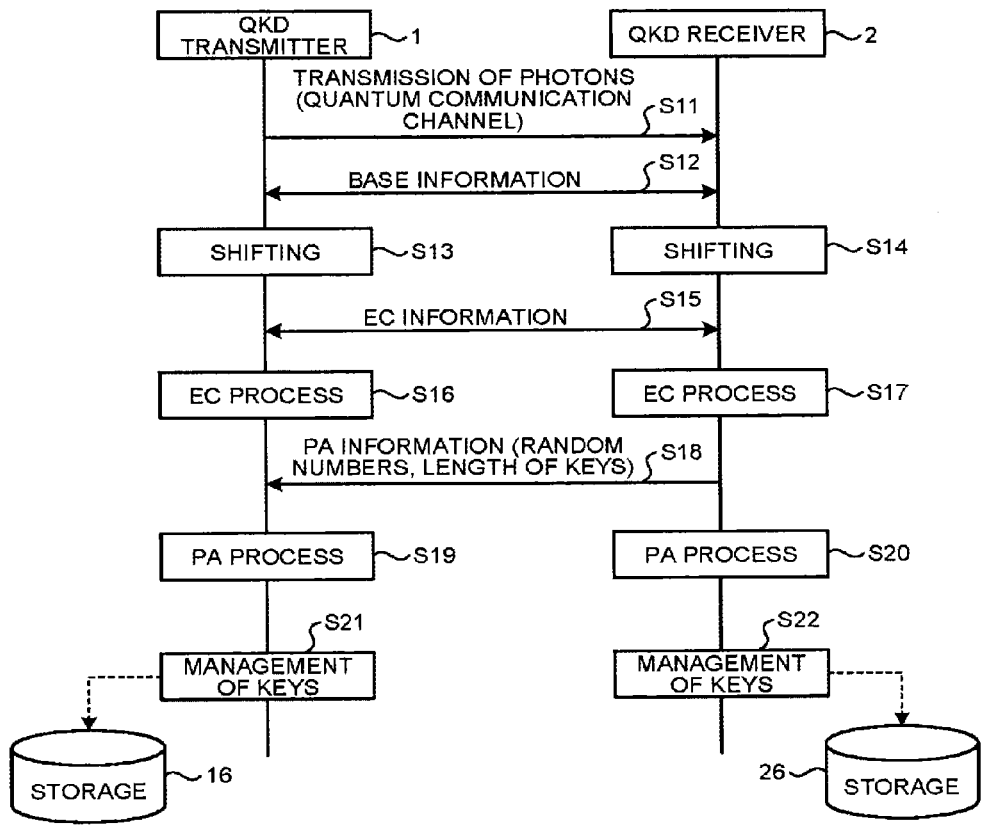
FIG. 4 is a sequence diagram illustrating an example of the operations performed by the QKD transmitter and the QKD receiver.
Figure 5:
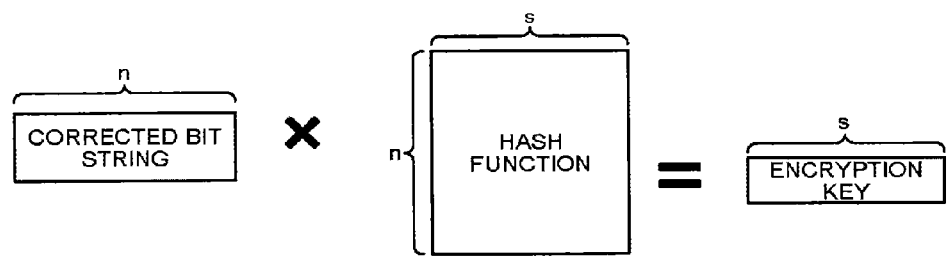
FIG. 5 is a diagram for explaining a key compression process.

FIG. 4 is a sequence diagram illustrating an example of the operations performed by the QKD transmitter and the QKD receiver. FIG. 5 is a diagram for explaining the key compression process. Thus, an encryption key generation process performed by the QKD transmitter 1 and the QKD receiver 2 is explained with reference to FIGS. 4 and 5.

Step S11

For example, the quantum key sharing unit 10 of the QKD transmitter 1 sends, to the quantum key sharing unit 20 of the QKD receiver 2 via the quantum communication channel, a photon bit string made of single photons having a state based on base information that is generated in a random manner as against a bit string generated using random numbers. Thus, the quantum key sharing unit 20 receives the photon bit string from the quantum key sharing unit 10 via the classical communication channel, and reads the photon bit string based on the base information generated in a random manner.

Step S12

The quantum key sharing unit 10 receives the base information, which is generated in a random manner by the quantum key sharing unit 20 for the purpose of reading the received photon bit string, via the classical communication channel. On the other hand, the quantum key sharing unit 20 receives the base information, which is generated in a random manner by the quantum key sharing unit 10 for the purpose of sending the photon bit string, via the classical communication channel.

Step S13

The quantum key sharing unit 10 performs a shifting process in which it compares the base information generated by itself with the base information received from the quantum key sharing unit 20; extracts the bits corresponding to the matching portion from the photon bit strings; and treats the extracted bits as a shared bit string. Then, the quantum key sharing unit 10 sends the shared bit string to the EC processor 11.

Step S14

The quantum key sharing unit 20 performs a shifting process in which it compares the base information generated by itself with the base information received from the quantum key sharing unit 10; extracts the bits corresponding to the matching portion from the photon bit strings; and treats the extracted bits as a shared bit string. Then, the quantum key sharing unit 20 sends the shared bit string to the EC processor 21.

Step S15

The EC processor 11 of the QKD transmitter 1 and the EC processor 21 of the QKD receiver 2 exchange EC information, which represents the control data for correcting the errors in the shared bit strings, via the classical communication channel.

Step S16

Based on the EC information exchanged with the EC processor 21 via the classical communication channel, the EC processor 11 performs an EC process in which it corrects the bit errors in the shared bit string and generates a corrected bit string. Herein, the corrected bit string generated by the EC processor 11 matches with a corrected bit string generated by the EC processor 21 by performing correction with respect to the shared bit string. Then, the EC processor 11 sends the corrected bit string to the PA processor 12.

Step S17

Based on the EC information exchanged with the EC processor 11 via the classical communication channel, the EC processor 21 performs an EC process that includes correction of the bit errors in the shared bit string and generation of a corrected bit string. Herein, the corrected bit string generated by the EC processor 21 matches with the corrected bit string generated by the EC processor 11 by performing correction with respect to the shared bit string. Then, the EC processor 21 sends the corrected bit string to the PA processor 22.

Step S18

The PA processor 22 of the QKD receiver 2 sends PA information (such as random numbers and length information of the encryption key) to the PA processor 12 of the QKD transmitter 1 via the classical communication channel. Thus, the PA processor 12 receives the PA information from the PA processor 22 via the classical communication channel.

Step S19

Based on the received PA information, the PA processor 12 performs a key compression process (a privacy amplification process, a PA process) with respect to the corrected bit string with the aim of cancelling out, from the number of errors corrected by the EC processor 11, the bits that are likely to have been tapped by an eavesdropper during the operations of the quantum key sharing unit 10 and the EC processor 11. More particularly, as illustrated in FIG. 5, the PA processor 12 generates a hash function in the form of an $n \times s$ matrix from a length n of the corrected bit string generated by the EC processor 11, the random numbers included in the PA information, and a length s of the encryption key. Then, the PA processor 12 multiplies the hash function to the corrected bit string, and generates an encryption key (a key bit string) having the length s. Subsequently, the PA processor 12 sends the generated encryption key to the key management unit 14. Meanwhile, the method implemented for the key compression process is not limited to using the hash function as described above. That is, the key compression process can be performed using other methods.

Step S20

Based on the received PA information, the PA processor 22 performs a key compression process (a privacy amplification process, a PA process) with respect to the corrected bit string with the aim of cancelling out, from the number of errors corrected by the EC processor 21, the bits that are likely to have been tapped by an eavesdropper during the operations of the quantum key sharing unit 20 and the EC processor 21. More particularly, in an identical manner to the PA processor 12, the PA processor 22 generates an encryption key (a key bit string); and sends the generated encryption key to the key management unit 24.

Step S21

The key management unit 14 stores the encryption key, which is generated by the PA processor 12, in the storage 16 and manages the encryption key. Then, the key provider 15 retrieves the encryption key from the storage 16 as may be necessary, and provides it to an external application.

Step S22

The key management unit 24 stores the encryption key, which is generated by the PA processor 22, in the storage 26 and manages the encryption key. Then, the key provider 25 retrieves the encryption key from the storage 26 as may be necessary, and provides it to an external application.

As a result of performing the operations described above, identical encryption keys are generated in the QKD transmitter 1 and the QKD receiver 2. Herein, the encryption keys generated as a result of performing the operations described above are one-time pad keys that can be used only once. Hence, because of the operations described above, different encryption keys are generated in a repeated manner.

In the quantum key distribution system 100, the encryption keys that are generated are used by various applications performing cryptographic communication. Usually, if many encryption keys are generated, then there is a proportional increase in the encryption strength and communicable time of the cryptographic communication. Hence, it is desired that encryption keys having a large size be generated with a high frequency. However, in the quantum key distribution system 100, if the encryption keys are generated at random, it leads to an increase in the processing load of the QKD transmitter 1 and the QKD receiver 2. Moreover, if there is a decrease in the frequency of usage of the encryption keys, then it may place burden on the amount of available space in the storages 16 and 26 that are used in storing the encryption keys.

Thus, in the quantum key distribution system 100, in order to avoid such a situation, it is necessary to perform a restraining operation in which the frequency of generating the encryption keys is reduced or the size of the encryption keys is reduced according to various conditions (examples of the conditions are described later). More particularly, the controller 17 (the controller 27) needs to ensure that the total number of bits of one or more encryption keys generated per unit time by the PA processor 12 (the PA processor 22) as a result of performing the restraining operation is smaller than the total number of bits of the one or more encryption keys generated per unit time by the PA processor 12 (the PA processor 22) in the case of not performing the restraining operation.

Meanwhile, as described above, during the transmission and reception of photon bit strings by the quantum key sharing unit 10 and the quantum key sharing unit 20 via the quantum communication channel as well as while performing the shifting process, it is necessary to have synchronization between the receiver and the transmitter. Hence, if the operations are temporarily stopped, then the temporal cost of restarting the operations is high. Therefore, it is not neither desirable to stop the transmission and reception of photon bit strings by the quantum key sharing unit 10 and the quantum key sharing unit 20 via the quantum communication channel nor desirable to stop the shifting process. Hence, the premise herein is that, while the QKD transmitter 1 and the QKD receiver 2 are in operation, the transmission and reception of photon bit strings by the quantum key sharing unit 10 and the quantum key sharing unit 20 via the quantum communication channel is performed without interruption as well as the shifting process is performed without interruption. That is, the premise is that the quantum key sharing unit 10 and the quantum key sharing unit 20 constantly generate the shared bit strings.

In the first embodiment, in the quantum key distribution system 100, one of the following restraining operations (A) to (C) is performed.

(A) One, some, or all of the encryption keys (key bit strings) generated by the PA processor 12 (the PA processor 22) are either deleted without sending them to the key management unit 14 (the key management unit 24) or reduced in size.

(B) One, some, or all of the corrected bit strings generated by the EC processor 11 (the EC processor 21) are either deleted without sending them to the PA processor 12 (the PA processor 22) or reduced in size.

(C) One, some, or all of the shared bit strings generated by the quantum key sharing unit 10 (the quantum key sharing unit 20) are either deleted without sending them to the EC processor 11 (the EC processor 21) or reduced in size.

Regarding each of the restraining operations (A) to (C), the explanation is given with reference to the restraining operation performed in the QKD transmitter 1. The restraining operation performed in the QKD receiver 2 is identical to the restraining operation performed in the QKD transmitter 1.

Firstly, the explanation is given about the restraining operation (A). The controller 17 of the QKD transmitter 1 either deletes one, some, or all of the encryption keys (the key bit strings) generated by the PA processor 12 without sending them to the key management unit 14, or reduces the size of one, some, or all of the encryption keys. In the case in which the controller 17 deletes one or some of the encryption keys generated by the PA processor 12, the remaining encryption keys are subjected to the processes from Step S21 onward illustrated in FIG. 4. Thus, eventually, some encryption keys are generated and stored in the storage 16. Meanwhile, regarding which encryption keys are to be deleted or reduced in size or regarding the manner in which the encryption keys are to be deleted, the controller 17 achieves synchronization with the controller 27 of the QKD receiver 2. More particularly, the controller 17 shares, with the controller 27 via the classical communication channel, the IDs of the encryption keys to be deleted or reduced in size, the information regarding the method of achieving size reduction, and the information regarding the method of deletion.

In this way, as a result of performing the restraining operation (A), it becomes possible to reduce the number and the frequency of generation of the encryption keys that are eventually stored in the storages, and to reduce the size of the stored encryption keys. Moreover, at the stage at which the process of sequentially generating the encryption keys is completed, the encryption keys are deleted or reduced in size. Hence, the restraining operation of the controller 17 can be implemented in a simple manner.

Next, the explanation is given about the restraining operation (B). The controller 17 of the QKD transmitter 1 either deletes one, some, or all of the corrected bit strings generated by the EC processor 11 without sending them to the PA processor 12, or reduces the size of one, some, or all of the corrected bit strings. In the case in which the controller 17 deletes one or some of the corrected bit strings generated by the EC processor 11, the remaining corrected bit strings are subjected to the processes from Step S18 onward illustrated in FIG. 4. Thus, eventually, some corrected bit strings are generated and stored in the storage 16. Meanwhile, regarding which corrected bit strings are to be deleted or reduced in size or regarding the manner in which the corrected bit strings are to be deleted, the controller 17 achieves synchronization with the controller 27 of the QKD receiver 2. More particularly, the controller 17 shares, with the controller 27 via the classical communication channel, the IDs of the corrected bit strings to be deleted or reduced in size, the information regarding the method of achieving size reduction, and the information regarding the method of deletion.

In this way, as a result of performing the restraining operation (B), it becomes possible to reduce the number and the frequency of generation of the encryption keys, which are eventually stored in the storages, by the number of corrected bit strings that are deleted; and to reduce the size of the stored encryption keys by the amount equal to the reduced size of the corrected bit strings. Moreover, since there is a decrease in the processing amount from Step S18 onward illustrated in FIG. 4, the processing load of the QKD transmitter 1 and the QKD receiver 2 is reduced. In this case, when the controller 17 deletes all of the corrected bit strings, the PA processor 12 may stop to perform the key compression process. Furthermore, this restraining operation can be implemented in the case in which the operations till the generation of the corrected bit strings are performed and followed by operations with a different purpose such as collecting statistical information of the error rate.

Next, the explanation is given about the restraining operation (C). The controller 17 of the QKD transmitter 1 either deletes one, some, or all of the shared bit strings generated by the quantum key sharing unit 10 without sending them to the EC processor 11, or reduces the size of one, some, or some of the shared bit strings. In the case in which the controller 17 deletes one or some of the shared bit strings generated by the quantum key sharing unit 10, the remaining shared bit strings are subjected to the operations from Step S15 onward illustrated in FIG. 4. Thus, eventually, some encryption keys are generated and stored in the storage 16. Meanwhile, regarding which shared bit strings are to be deleted or reduced in size or regarding the manner in which the shared bit strings are to be deleted, the controller 17 achieves synchronization with the controller 27 of the QKD receiver 2. More particularly, the controller 17 shares, with the controller 27 via the classical communication channel, the IDs of the corrected bit strings to be deleted or reduced in size, the information regarding the method of achieving size reduction, and the information regarding the method of deletion.

In this way, as a result of performing the restraining operation (C), it becomes possible to reduce the number and the frequency of generation of the encryption keys, which are eventually stored in the storages, by the number of shared bit strings that are deleted; and to reduce the size of the stored encryption keys by the amount equal to the reduced size of the shared bit strings. Moreover, since there is a decrease in the processing amount from Step S15 onward illustrated in FIG. 4, the processing load of the QKD transmitter 1 and the QKD receiver 2 is reduced. In this case, when the controller 17 deletes all of the shared bit strings, either one of the error correction process performed by the EC processor 11 or the key compression process performed by the PA processor 12 may be stopped.

Meanwhile, the controller 17 is not limited perform only one of the restraining operations (A) to (C), and can arbitrarily combine the restraining operations.

The restraining operations (A) to (C) need to be performed according to the various conditions described above. Herein, the scope of a restraining operation, that is, the extent of lowering the frequency of generation of the encryption keys or the extent of reducing the size of the encryption keys is referred to as a restraining amount. Explained below are exemplary parameters that serve as the conditions for determining the restraining amount.

(i) link priority: indicates the priority set for each quantum key distribution system (link (coupling) between two QKD devices) that constitutes the key sharing network 200 illustrated in FIG. 2. Higher the priority of a link, smaller is the restraining amount. On the other hand, lower the priority of link, greater is the restraining amount.

(ii) application priority: indicates the priority set for each type of applications that make use of encryption keys. Higher the priority of the application being executed, smaller is the restraining amount. On the other hand, lower the priority of the application being executed, greater is the restraining amount.

(iii) in-execution application count: indicates the number of applications being executed using encryption keys. Greater the number of in-execution applications, smaller is the restraining amount. On the other hand, smaller the number of in-execution applications, greater is the restraining amount.

(iv) encryption key usage frequency: indicates the frequency with which an application makes use of encryption keys. The greater the usage frequency, the smaller the restraining amount. On the other hand, the smaller the usage frequency, the greater the restraining amount.

(v) available storage space: indicates the available storage space in the storages 16 and 26 that are used in storing encryption keys. The greater the available storage space, the smaller the restraining amount. On the other hand, the smaller the usage frequency, the greater the restraining amount.

(vi) encryption key storage volume: indicates the volume of stored encryption keys (the number of stored encryption keys or the total data size of the stored encryption keys). The smaller the encryption key storage volume, the smaller the restraining amount. On the other hand, the greater the encryption key storage volume, the greater the restraining amount.

The controller 17 and the controller 27 determine the restraining amount according to at least one of the parameters described above, and perform the restraining operation based on the determined restraining amount. Moreover, as far as the parameters described above are concerned, it is necessary to get to know the matching parameters in the QKD transmitter 1 and the QKD receiver 2. Hence, the QKD transmitter 1 (or the QKD receiver 2) collects the necessary information for determining the parameters, and sends those parameters to the QKD receiver 2 (or the QKD transmitter 1) via the classical communication channel. Then, based on the matching parameters, the controllers 17 and 27 perform the restraining operation.

Of the parameters described above, the parameters (iii) to (v) are dynamically variable according to the operations performed by the QKD transmitter 1 and the QKD receiver 2 and according to the operations performed by information processing devices connected to the QKD device. Thus, for example, the configuration can be such that, if a particular parameter falls below a predetermined threshold value (a first threshold value), the controller 17 (or the controller 27) performs the restraining operation. On the other hand, the configuration can be such that, when a particular parameter exceeds the same threshold value or a different threshold value (a second threshold value), the controller 17 (or the controller 27) stops performing the restraining operation.

Figure 6:
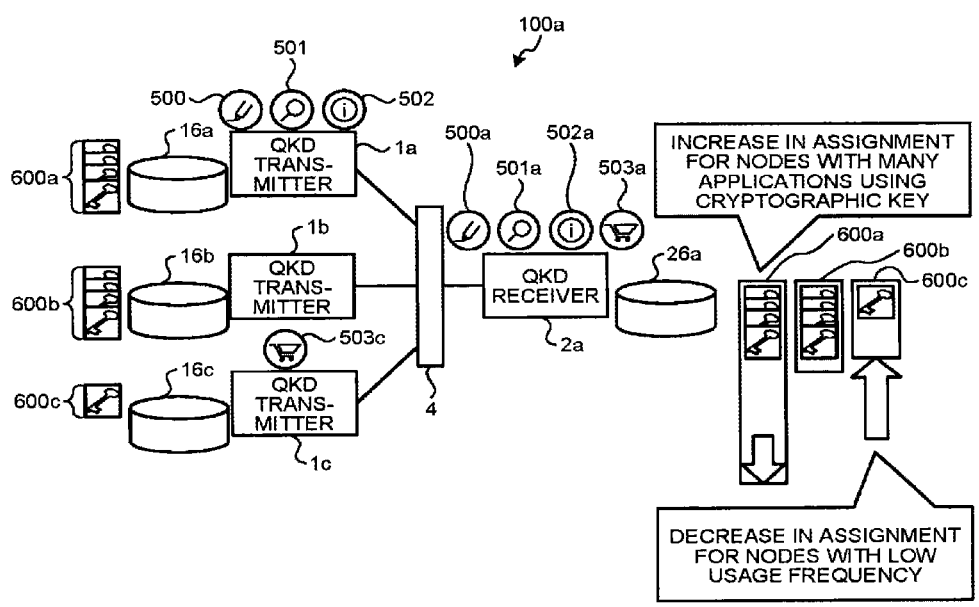
FIG. 6 is a diagram for explaining an operation of adjusting assignment of encryption key generation.

FIG. 6 is a diagram for explaining an operation of adjusting assignment of encryption key generation. Thus, explained below with reference to FIG. 6 is a specific restraining operation in the case in which, for example, the parameters (i) link priority and (iii) in-execution application count are taken into account.

As illustrated in FIG. 6, a quantum key distribution system 100a does not configure a system in which a single QKD transmitter and a single QKD receiver are connected via a quantum communication channel as illustrated in FIG. 1 but configures a quantum access network described above. The quantum key distribution system 100a includes QKD transmitters 1a to 1c, a QKD receiver 2a, and an optical device 4.

Each of the QKD transmitters 1a to 1c is connected to the input side of the optical device 4 via a quantum communication cable (an optical fiber cable). Moreover, the QKD transmitters 1a to 1c include storages 16a to 16c, respectively.

The QKD receiver 2a is connected to the output side of the optical device 4 via a quantum communication channel (an optical fiber cable). Moreover, the QKD receiver 2a includes a storage 26a.

As illustrated in FIG. 6, in the quantum key distribution system 100a, there are three types of links, namely, a link between the QKD transmitter 1a and the QKD receiver 2a (hereinafter, called a link A), a link between the QKD transmitter 1b and the QKD receiver 2a (hereinafter, called a link B), and a link between the QKD transmitter 1c and the QKD receiver 2a (hereinafter, called a link C). For each of these links, an identical encryption key is generated and shared according to the operations illustrated in FIG. 4.

The QKD transmitter 1a is connected to an external device that is capable of communicating with the QKD transmitter 1a and that executes three types of applications, namely, applications 500 to 502. Meanwhile, there need not be only a single external device. Alternatively, for example, there can be three external devices each executing one of the applications 500 to 502. Still alternatively, there can be two external devices one of which executes the applications 500 and 501, while the other external device executes the application 502. Meanwhile, at least one of the applications 500 to 502 may be executed by the QKD transmitter 1a instead of an external device.

The QKD transmitter 1c is connected to an external device that is capable of communicating with the QKD transmitter 1c and that executes an application 503c. However, alternatively, the application 503c may be executed by the QKD transmitter 1c instead of an external device.

The QKD receiver 2a is connected to an external device that is capable of communicating with the QKD receiver 2a and that executes four types of applications, namely, applications 500a to 503a. Meanwhile, there need not be only a single external device. Alternatively, there can be two external devices one of which executes the applications 500a and 501a, while the other external device executes the applications 502a and 503a. Meanwhile, at least one of the applications 500a to 503a may be executed by the QKD receiver 2a instead of an external device.

The application 500, the application 501, the application 502, and the application 503c respectively correspond to the applications 500a to 503a; and data communication is performed between the applications. The QKD transmitter 1a and the QKD receiver 2a generate encryption keys that enable the applications 500 to 502 to perform cryptographic communication with the applications 500a to 502a, respectively. Then, an encryption key 600a representing a bundle of generated encryption keys is stored in the storages 16a and 26a. The QKD transmitter 1c and the QKD receiver 2a generate encryption keys that enable the application 503c to perform cryptographic communication with the application 503a. Then, an encryption key 600c representing a bundle of generated encryption keys is stored in the storages 16a and 26a. Herein, it is assumed that no application is being executed in the external devices connected to the QKD transmitter 1b and the QKD receiver 2a or no application is being executed in the QKD transmitter 1b and the QKD receiver 2a. However, the QKD transmitter 1b and the QKD receiver 2a generate encryption keys for the link B and store an encryption key 600b, which represents the bundle of generated encryption keys, in the storages 16a and 26a, respectively. Meanwhile, the links A to C are assigned with link priorities YA to YC, respectively, that satisfy the relationship of YA=YC<YB.

Given below is the explanation of the restraining operation performed in the abovementioned state of the quantum key distribution system 100a. The number (types) of in-execution applications corresponding to the link A is three, while the number (types) of in-execution applications corresponding to the link C is one. Hence, the restraining amount for the restraining operation performed by the QKD transmitter 1a and the QKD receiver 2a corresponding to the link A is set to be smaller than the restraining amount for the restraining operation performed by the QKD transmitter 1c and the QKD receiver 2a corresponding to the link C. As a result, the number of encryption keys 600a generated in the link A becomes greater than the number of encryption keys 600c generated in the link C.

The priority YB of the link B is higher than the priority YA (the priority YC) of the link A (the link C). Hence, although the number of in-execution applications corresponding to the link B is zero, the restraining operation performed with the restraining amount based on the link priority YB results in the generation of a predetermined number of encryption keys 600b in the link B.

In this way, based on the parameters related thereto, the QKD transmitter 1 and the QKD receiver 2 determine the restraining amount for the restraining operation. With that, it becomes possible for the QKD transmitter 1 and the QKD receiver 2 to generate encryption keys upon performing the restraining operation with a suitable restraining amount.

Hence, it becomes possible to reduce the processing load of the QKD transmitter 1 and the QKD receiver 2 while ensuring normality in the cryptographic communication performed by the applications using the encryption keys. Moreover, it becomes possible to avoid a situation of placing burden on the amount of available space in the storages 16 and 26 that are used in storing the encryption keys. Thus, it becomes possible to reduce the consumption of resources of the QKD transmitter 1 and the QKD receiver 2 in the quantum key distribution system 100.

As a result of performing the restraining operation (A) described above, it becomes possible to reduce the number and the frequency of generation of the encryption keys that are eventually stored in the storages, as well as to reduce the size of the stored encryption keys. Moreover, once the operation of generating a series of encryption keys is completed, the encryption keys are deleted or the size of the encryption keys is reduced. As a result, the restraining operation by the controller 17 can be implemented in a simple manner.

As a result of performing the restraining operation (B) described above, it becomes possible to reduce the number and the frequency of generation of the encryption keys, which are eventually stored in the storages, by the number of corrected bit strings that are deleted; and to reduce the size of the stored encryption keys by the amount equal to the reduced size of the corrected bit strings. Moreover, since there is a decrease in the processing amount from Step S18 onward illustrated in FIG. 4, the processing load of the QKD transmitter 1 and the QKD receiver 2 is reduced. Furthermore, this restraining operation can be implemented in the case in which the operations till the generation of the corrected bit strings are performed and followed by operations with a different purpose such as collecting statistical information of the error rate.

As a result of performing the restraining operation (C) described above, it becomes possible to reduce the number and the frequency of generation of the encryption keys, which are eventually stored in the storages, by the number of shared bit strings that are deleted; and to reduce the size of the stored encryption keys by the amount equal to the reduced size of the shared bit strings. Moreover, since there is a decrease in the processing amount from Step S15 onward illustrated in FIG. 4, the processing load of the QKD transmitter 1 and the QKD receiver 2 is reduced.

Second Embodiment

Regarding the configuration and operations of a quantum key distribution system according to a second embodiment, the explanation is given with a focus on the differences with the quantum key distribution systems 100 and 100*a* according to the first embodiment. Herein, the configuration of the quantum key distribution system according to the second embodiment is identical to the first embodiment; and the configuration of a quantum key distribution network including that quantum key distribution system is also identical to the first embodiment.

Figure 7:
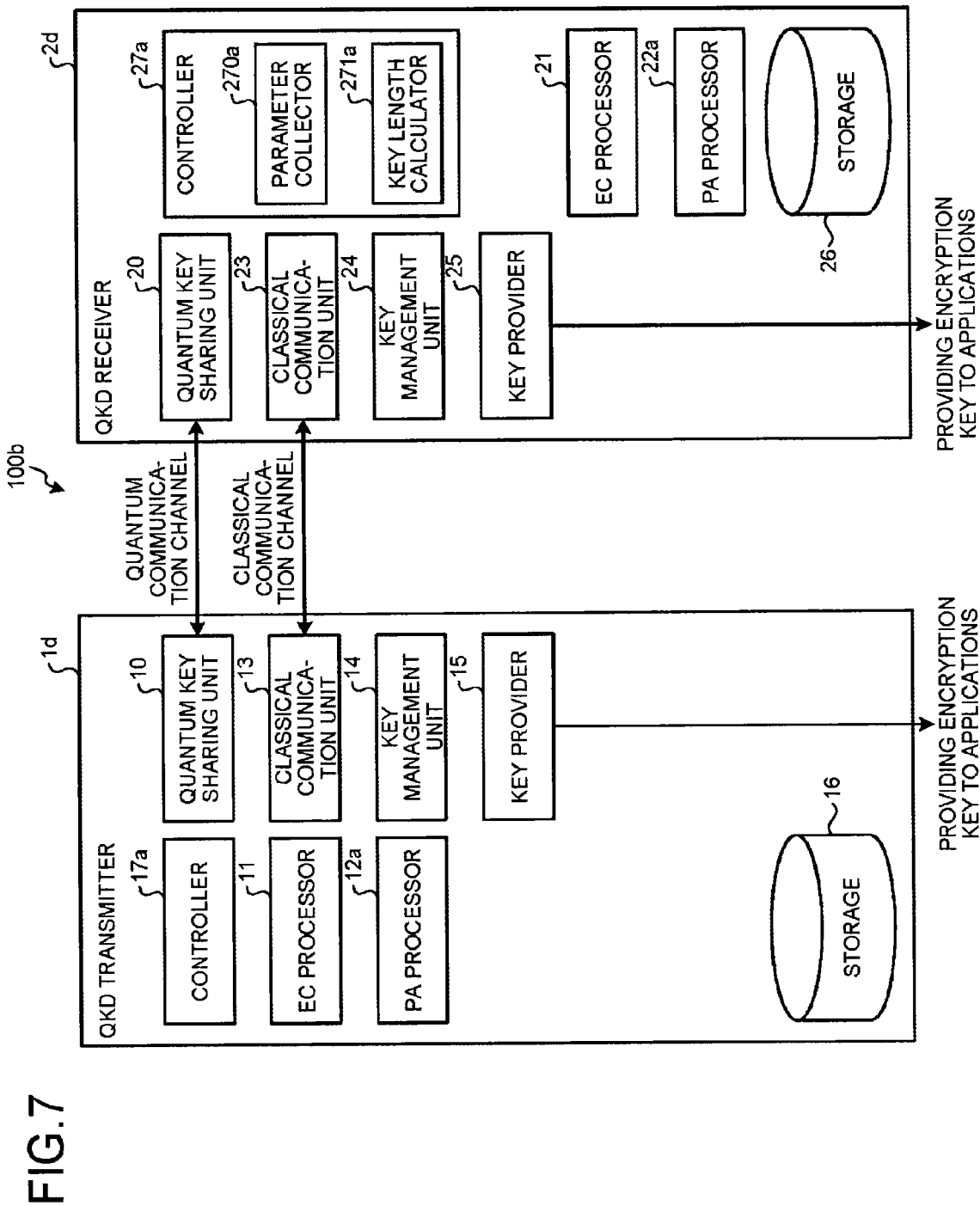
FIG. 7 is a diagram illustrating an exemplary block configuration of a QKD transmitter and a QKD receiver.

FIG. 7 is a diagram illustrating an exemplary block configuration of a QKD transmitter and a QKD receiver according to the second embodiment. Thus, the explanation of a functional block configuration of a QKD transmitter 1*d* and a QKD receiver 2*d* in a quantum key distribution system 100*b* is given below with reference to FIG. 7.

The QKD transmitter 1*d* includes the quantum key sharing unit 10, the EC processor 11, a PA processor 12*a* (a compressor), the classical communication unit 13, the key management unit 14, the key provider 15, the storage 16, and a controller 17*a*.

The controller 17*a* performs overall control of the QKD transmitter 1*d*. As part of the restraining operation regarding encryption keys, the controller 17*a* receives information about the length s of encryption keys from a controller 27*a* as part of the PA information and sends that information to the PA processor 12*a*. The details of the restraining operation regarding encryption keys as performed by the controllers 17*a* and 27*a* are given later.

The PA processor 12*a* receives, from the controller 17*a*, a part of the PA information in the form of information about the length s of encryption keys calculated by a key length calculator 271*a* (described later); and receives, from a PA processor 22*a* via the classical communication channel, a part of the PA information in the form of information about random numbers. The PA processor 12*a* performs a key compression process (a privacy amplification process) with respect to the corrected bit string with the aim of cancelling out the bits that are likely to have been tapped by an eavesdropper during the operations of the quantum key sharing unit 10 and the EC processor 11. More particularly, as illustrated in FIG. 5, the PA processor 12*a* generates a hash function in the form of an n×s matrix from the length n of the corrected bit string generated by the EC processor 11, the length s of encryption keys included in the PA information, and random numbers. Then, the PA processor 12*a* multiplies the hash function to the corrected bit string, and generates an encryption key (a key bit string) having the length s. Subsequently, the PA processor 12*a* sends the generated encryption key to the key management unit 14.

The key management unit 14 stores the encryption keys (the key bit string), which are generated by the PA processor 12*a*, in the storage 16, and manages those encryption keys.

Meanwhile, the quantum key sharing unit 10, the EC processor 11, the PA processor 12*a*, the key management unit 14, the key provider 15, and the controller 17*a* can be implemented either using computer programs that are executed in a CPU or using hardware circuitry.

The QKD receiver 2*d* includes the quantum key sharing unit 20, the EC processor 21, the PA processor 22*a* (compressor), the classical communication unit 23, the key management unit 24, the key provider 25, the storage 26, and the controller 27*a*.

The controller 27*a* performs overall control of the QKD receiver 2*d*. The controller 27*a* includes a parameter collector 270*a* and the key length calculator 271*a*. As described above, the controller 27*a* sends, to the controller 17*a* via the classical communication channel, a part of the PA information in the form of information about the length s of encryption keys calculated by the key length calculator 271*a*. Moreover, the controller 27*a* sends, to the PA processor 22*a*, a part of the PA information in the form of information about the length s of encryption keys.

The parameter collector 270*a* collects parameters that are used by the key length calculator 271*a* in calculating the length s of encryption keys. As the parameters, the parameter collector 270*a* collects a detection pulse count Q, an error rate E, an EC efficiency $f_{EC}$ (an error correction efficiency), and an available storage space S. The details of these parameters are given later.

The key length calculator 271*a* calculates, as the restraining operation regarding encryption keys, the length s of encryption keys based on the detection pulse count Q, the error rate E, the EC efficiency $f_{EC}$, and the available storage space S collected by the parameter collector 270*a*. A specific method of calculating the length s of encryption keys is described later in detail. Meanwhile, although the controller 27a (the key length calculator 271a) calculates the length s of encryption keys, that is not the only possible case. Alternatively, the controller 17a can also calculate the length s of encryption keys.

The PA processor 22a receives, from the controller 27a, the PA information in the form of the length s of encryption keys that is calculated by the key length calculator 271a (described later). Moreover, the PA processor 22a generates random numbers for generating the hash function and sends, to the PA processor 12a via the classical communication channel, information about the generated random numbers as the PA information. Moreover, the PA processor 22a performs a key compression process (a privacy amplification process) with respect to the corrected bit string with the aim of cancelling out the bits that are likely to have been tapped by an eavesdropper during the operations of the quantum key sharing unit 20 and the EC processor 21. More particularly, as illustrated in FIG. 5, the PA processor 22a generates a hash function in the form of an n×s matrix from the length n of the corrected bit string generated by the EC processor 21, the length s of encryption keys included in the PA information, and random numbers. Then, the PA processor 22a multiplies the hash function to the corrected bit string, and generates an encryption key (a key bit string) having the length s. Subsequently, the PA processor 22a sends the generated encryption key to the key management unit 24.

The key management unit 24 stores the encryption keys (the key bit string), which are generated by the PA processor 22a, in the storage 26, and manages those encryption keys.

Meanwhile, the quantum key sharing unit 20, the EC processor 21, the PA processor 22a, the key management unit 24, the key provider 25, and the controller 27a can be implemented either using computer programs that are executed in a CPU or using hardware circuitry.

Explained below with reference to FIGS. 4 and 5 are the operations for generating encryption keys as performed by the QKD transmitter 1d and the QKD receiver 2d in the state in which the controllers 17a and 27a have performed the restraining operation. Herein, the explanation is given with a focus on the differences with the first embodiment.

Steps S11 to S15

The processes are identical to the processes performed from Steps S11 to S15 according to the first embodiment.

Step S16

Based on the EC information exchanged with the EC processor 21 via the classical communication channel, the EC processor 11 performs an EC process that includes correction of the bit errors in the shared bit string and generation of a corrected bit string. Herein, the corrected bit string generated by the EC processor 11 matches with a corrected bit string generated by the EC processor 21 by performing correction with respect to the shared bit string. Then, the EC processor 11 sends the corrected bit string to the PA processor 12a.

Step S17

Based on the EC information exchanged with the EC processor 11 via the classical communication channel, the EC processor 21 performs an EC process that includes correction of the bit errors in the shared bit string and generation of a corrected bit string. Herein, the corrected bit string generated by the EC processor 21 matches with the corrected bit string generated by the EC processor 11 by performing correction with respect to the shared bit string. Then, the EC processor 21 sends the corrected bit string to the PA processor 22a.

Step S18

As the parameters, the parameter collector 270a of the controller 27a collects the detection pulse count Q, the error rate E, the EC efficiency $f_{EC}$, and the available storage space S. The detection pulse count Q represents the bit count of the photon bit strings generated by the quantum key sharing unit 10 and sent to the quantum key sharing unit 20. As described earlier, the length of the shared bit strings is determined based on the base information generated in a random manner by the quantum key sharing units 10 and 20. Hence, statistically, the length of the shared bit strings is substantially half of the photon bit strings, that is, equal to (½)Q.

The error rate E represents the percentage of bits estimated to be errors in the shared bit string after the shifting process has been performed by the quantum key sharing units 10 and 20. The EC efficiency $f_{EC}$ represents a value that is determined according to the method of EC process and the error rate E and is determined based on the number of times for which the EC information is sent and received via the classical communication channel accompanying the EC process. That is, greater the number of times for which the EC information is sent and received via the classical communication channel, greater is the degree of vulnerability to tapping. Hence, it leads to an increase in the number of bits that need to be deleted, thereby causing a decline the EC efficiency undergoes and an increase in the value of the EC efficiency $f_{EC}$.

The available storage space S represents a value based on the available space in the storages 16 and 26. For example, the available storage space S can be the average of the available space in the storage 16 and the available space in the storage 26, or can be the smaller available space from among the available space in the storage 16 and the available space in the storage 26.

Figure 8:
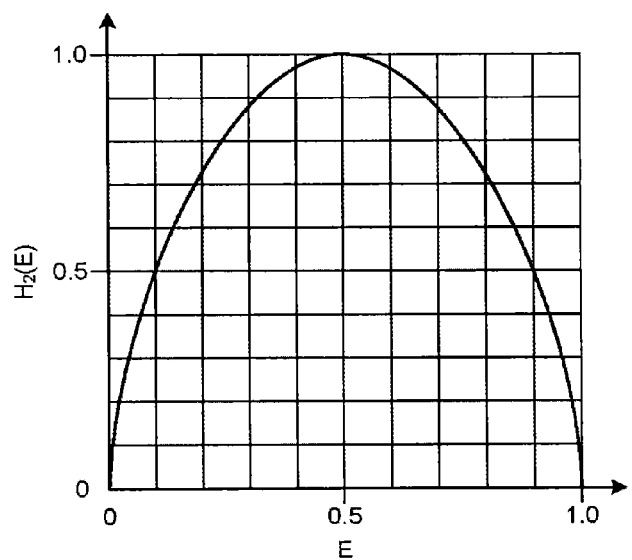
FIG. 8 is a diagram illustrating a binary entropy function.

Herein, for example, according to the Shore and Preskill security proof that authenticates the safety of cryptographic communication based on the theory of communication, a length $R_{secure}$ of the encryption keys is expressed below in Equation (1) using the detection pulse count Q, the error rate E, and the EC efficiency $f_{EC}$.

$$R_{secure} = \tfrac{1}{2}Q\{1 - H_2(E) - f_{EC}(E) \times H_2(E)\} \tag{1}$$

where E is an error rate, Q is a detection pulse count, $f_{EC}(E)$ is an EC efficiency (determined according to EC method), and $H_2(E)$ represents a binary entropy function that is the function of the error rate E as illustrated in FIG. 8.

In the second embodiment, the key length calculator 271a calculates the length s of cryptography keys according to Equation (2) given below by taking into account not only the detection pulse count Q, the error rate E, and the EC efficiency $f_{EC}$ but also, for example, the available storage space S.

$$s = \tfrac{1}{2}Q\{1 - H_2(E) - f_{EC}(E) \times H_2(E)\} \times f'(S) \tag{2}$$

where E is an error rate, Q is a detection pulse count, $f_{EC}(E)$ is an EC efficiency (determined according to EC method), $H_2(E)$ represents a binary entropy function, S represents an available storage space, and f'(S) represents an available storage space term that is 1 if $S > S_0$; 0 or $S/S_0$ if $S \le S_0$.

With respect to the length of the encryption key that is calculated according to Equation (1) given above and that is authenticated for safety of cryptographic communication, a change occurring in the direction of reduction does not have any effect on the authentication. That is, there is no decline in the strength of the safety of the authenticated cryptographic communication. Thus, in Equation (2) given above, since an available storage space term f'(S) takes a value in the range of 0 to 1, the calculated length s of encryption keys becomes smaller than the length $R_{secure}$. Hence, there is no decline in the strength of the safety of the cryptographic communication. Meanwhile, in Equation (2), a value $S_0$ represents a predetermined value used in determining the value of the available storage space term f(S).

Herein, although the length s of encryption keys is calculated by also treating the available storage space S as a parameter, that is not the only possible case. Alternatively, for example, other than the available storage space S, the key length calculator 271a can calculate the length s of encryption keys based on any of the parameters (i) to (iv) or based on the parameter (vi).

As described later, the controller 27a sends, to the controller 17a via the classical communication channel, a part of the PA information in the form of information about the length s of encryption keys that is calculated by the key length calculator 271a. Moreover, the controller 27a sends, to the PA processor 22a, a part of the PA information in the form of information about the length s of encryption keys.

During the restraining operation regarding encryption keys, the controller 17a receives information about the length s of encryption keys from the controller 27a as part of the PA information and sends that information to the PA processor 12a.

The PA processor 22a receives, from the controller 27a, the PA information in the form of the length s of encryption keys that is calculated by the key length calculator 271a (described later). Moreover, the PA processor 22a generates random numbers for generating the hash function and sends, to the PA processor 12a via the classical communication channel, the information about the generated random numbers as the PA information.

The PA processor 12a receives, from the controller 17a, the PA information in the form of information about the length s of encryption keys that is calculated by the key length calculator 271a; and receives, from the PA processor 22a via the classical communication channel, the PA information in the form of information about random numbers.

Step S19

Based on the received PA information, the PA processor 12a performs a key compression process (a privacy amplification process) with respect to the corrected bit string with the aim of cancelling out the bits that are likely to have been tapped by an eavesdropper during the operations of the quantum key sharing unit 10 and the EC processor 11. More particularly, as illustrated in FIG. 5, the PA processor 12a generates a hash function in the form of an n×s matrix from the length n of the corrected bit string generated by the EC processor 11, the random numbers included in the PA information, and the length s of encryption keys. Then, the PA processor 12a multiplies the hash function to the corrected bit string, and generates an encryption key (a key bit string) having the length s. Subsequently, the PA processor 12a sends the generated encryption key to the key management unit 14.

Step S20

Based on the PA information, the PA processor 22a performs a key compression process (a privacy amplification process) with respect to the corrected bit string with the aim of cancelling out the bits that are likely to have been tapped by an eavesdropper during the operations of the quantum key sharing unit 20 and the EC processor 21. More particularly, in an identical manner to the PA processor 12a, the PA processor 22a generates an encryption key (a key bit string); and sends the generated encryption key to the key management unit 24.

Steps S21 and S22

The processes are identical to the processes performed at Steps S21 and S22 according to the first embodiment.

In this way, based on the parameters related thereto, the QKD transmitter 1d and the QKD receiver 2d determine the restraining amount for the restraining operation. More particularly, for example, as a parameter related to the QKD transmitter 1d and the QKD receiver 2d; the length s of compressed encryption keys is calculated using Equation (2) given above and based on the detection pulse count Q, the error rate E, the EC efficiency $f_{EC}$, and the available storage space S. With that, it becomes possible for the QKD transmitter 1d and the QKD receiver 2d to generate encryption keys upon performing the restraining operation with a suitable restraining amount. Hence, while ensuring normality in the cryptographic communication performed by the applications using the encryption keys, it becomes possible to avoid a situation of placing burden on the amount of available space in the storages 16 and 26 that are used in storing the encryption keys. Thus, it becomes possible to reduce the consumption of resources of the QKD transmitter 1d and the QKD receiver 2d in the quantum key distribution system 100b.

Figure 9:
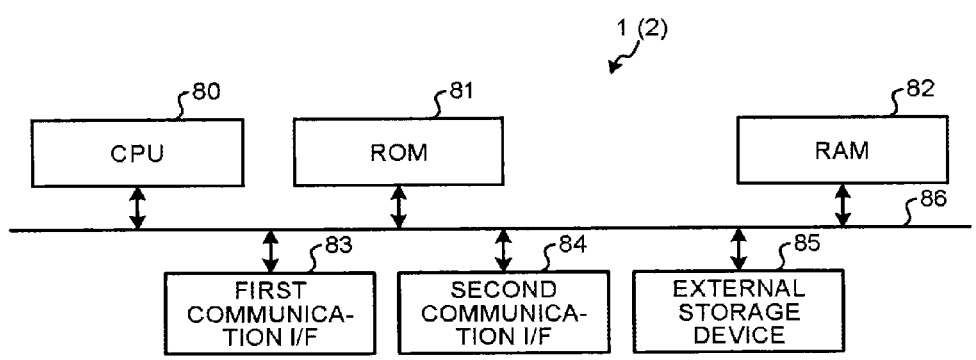
FIG. 9 is a hardware configuration diagram of a QKD device.

FIG. 9 is a hardware configuration diagram of a QKD device. Thus, the explanation of a hardware configuration of the QKD device according to the embodiments described above is given below with reference to FIG. 9.

The QKD device according to the embodiments includes a control device such as the CPU 80, a read only memory (ROM) 81, a random access memory (RAM) 82, a first communication I/F 83 that performs communication via a quantum communication channel, a second communication I/F 84 that performs communication via a classical communication channel, an external storage device 85 that serves as the storage for storing encryption keys, and a bus 86 that connects the constituent elements to each other.

The computer programs executed in the QKD device according to the embodiments are stored in advance in the ROM 81.

Alternatively, the computer programs executed in the QKD device according to the embodiments can be recorded as installable or executable files in a computer-readable storage medium such as a compact disk read only memory (CD-ROM), a flexible disk (FD), a compact disk recordable (CD-R), or a digital versatile disk (DVD); and can be provided in the form of a computer program product.

Still alternatively, the computer programs executed in the QKD device according to the embodiments can be saved as downloadable files on a computer connected to the Internet or can be made available for distribution through a network such as the Internet.

The computer programs executed in the QKD device according to the embodiments can cause a computer to function as the constituent elements of the QKD device (i.e., function as the quantum key sharing unit 10, the EC processor 11, the PA processor 12, the key management unit 14, the key provider 15, the controller 17, the quantum key sharing unit 20, the EC processor 21, the PA processor 22, the key management unit 24, the key provider 25, and the controller 27). In this computer, the CPU 80 can read the computer programs from a computer-readable storage medium, load them into a main storage device, and execute them.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A quantum key distribution device that is connected to another quantum key distribution device via a quantum communication channel and that generates and shares an identical encryption key with the another quantum key distribution device, the quantum key distribution device comprising:
   a quantum key sharing unit configured to generate a shared bit string by using quantum key distribution performed with the another quantum key distribution device via the quantum communication channel;
   a correcting unit configured to receive the shared bit string from the quantum key sharing unit and generate a corrected bit string through an error correction process with respect to the shared bit string;
   a compressor configured to receive the corrected bit string from the correcting unit and generate an encryption key through a key compression process with respect to the corrected bit string;
   a controller configured to perform a restraining operation in which the total number of bits of one or more encryption keys generated per unit time by the compressor is smaller than the total number of bits of the one or more encryption keys generated per unit time by the compressor in the case of not performing the restraining operation;
   wherein the controller is configured to adjust a restraining amount for the restraining operation based on a parameter related to the quantum key distribution device;
   the controller is configured to determine, based on a comparison between the parameter and a first threshold value, whether to perform the restraining operation; and
   the controller is configured to determine, based on a comparison between the parameter and a second threshold value, whether to stop the restraining operation.

2. The device according to claim 1, wherein the restraining operation to be performed by the controller includes reducing frequency at which the quantum key sharing unit sends the shared bit string to the correcting unit to a lower level than the frequency in the case of not performing the restraining operation, or deleting one, some, or all bits of the shared bit string.

3. The device according to claim 2, wherein either one of the error correction process performed by the correcting unit or the key compression process performed by the compressor is stopped when the controller deletes all of the shared bit strings.

4. The device according to claim 1, wherein the restraining operation to be performed by the controller includes reducing frequency at which the correcting unit sends the corrected bit string to the compressor to a lower level than the frequency in the case of not performing the restraining operation, or deleting one, some, or all bits of the corrected bit string.

5. The device according to claim 4, wherein the compressor configured to stop to perform the key compression process, when the controller deletes all of the corrected bit strings.

6. The device according to claim 1, wherein the restraining operation to be performed by the controller includes reducing frequency at which the compressor stores the encryption key in a storage to a lower level than the frequency in the case of not performing the restraining operation, or deleting one, some, or all bits of the encryption key.

7. The device according to claim 1, wherein
   the restraining operation to be performed by the controller includes sharing, with the another quantum key distribution device, a length of the encryption key calculated by either one of the quantum key distribution device and the another quantum key distribution device based on a parameter related to the quantum key distribution device and the another quantum key distribution device, and
   the compressor is configured to generate the encryption key from the corrected bit string so that the encryption key has the length shared by the controller.

8. The device according to claim 7, wherein, the length of the encryption key is calculated based on, as the parameter, an error rate that represents percentage of bits estimated to be errors in the shared bit string, an error correction efficiency, and at least one of a priority for a combination of the quantum key distribution device and the another quantum key distribution device, a priority for an application that receives the encryption key from the quantum key distribution device, an execution count of the application, a usage frequency of the encryption key, an available space in a storage, and a storage volume of the encryption key.

9. The device according to claim 1, wherein, the parameter is at least one of a priority for a combination of the quantum key distribution device and the another quantum key distribution device, a priority for an application that receives the encryption key from the quantum key distribution device, an execution count of the application, a usage frequency of the encryption key, an available space in a storage, and a storage volume of the encryption key.

10. A quantum key distribution system comprising a plurality of quantum key distribution devices, each corresponding to the quantum key distribution device according to claim 1, wherein
    the plurality of quantum key distribution devices are connected by the quantum communication channel and generate the identical encryption key through the restraining operation in a mutually corresponding manner.

11. A quantum key distribution method implemented in a quantum key distribution device that is connected to another quantum key distribution device via a quantum communication channel and that generates and shares an identical encryption key with the another quantum key distribution device, the method comprising:
    generating a shared bit string by using quantum key distribution performed with the another quantum key distribution device via the quantum communication channel;
    generating a corrected bit string through an error correction process with respect to the shared bit string;
    generating an encryption key through a key compression process with respect to the corrected bit string;
    performing a restraining operation in which the total number of bits of one or more encryption keys generated per unit time by the compressor is smaller than the total number of bits of the one or more encryption keys generated per unit time by the compressor in the case of not performing the restraining operation;

adjusting a restraining amount for the restraining operation based on a parameter related to the quantum key distribution device;

determining, based on a comparison between the parameter and a first threshold value, whether to perform the restraining operation, and determining, based on a comparison between the parameter and a second threshold value, whether to stop the restraining operation.

* * * * *